United States Patent [19]
Rackman

[11] Patent Number: 5,903,646
[45] Date of Patent: May 11, 1999

[54] ACCESS CONTROL SYSTEM FOR LITIGATION DOCUMENT PRODUCTION

[76] Inventor: Michael I. Rackman, 1710 Glenwood Rd., Brooklyn, N.Y. 11230

[21] Appl. No.: 08/300,163

[22] Filed: Sep. 2, 1994

[51] Int. Cl.⁶ .................................................. H04L 9/00
[52] U.S. Cl. .................... 380/4; 380/9; 380/21; 380/23; 380/25; 380/49; 380/50; 380/54
[58] Field of Search .................... 380/3, 4, 5, 9, 380/10, 23, 25, 49, 50, 54, 21

[56] References Cited

U.S. PATENT DOCUMENTS

| | | | |
|---|---|---|---|
| 5,195,133 | 3/1993 | Kapp et al. | 380/9 |
| 5,222,138 | 6/1993 | Balabon et al. | 380/23 |
| 5,297,202 | 3/1994 | Kapp et al. | 380/9 |
| 5,321,749 | 6/1994 | Virga | 380/18 |
| 5,369,704 | 11/1994 | Bennett et al. | 380/9 |
| 5,541,993 | 7/1996 | Fan et al. | 380/54 X |

*Primary Examiner*—Bernarr E. Gregory

[57] ABSTRACT

An access control system for litigation document production. Documents are produced as stored images on an optical disk. Documents which are to be redacted or maintained confidential are stored in encrypted form. As the litigation progresses, access by the opposing counsel/party to additional documents can be effected by distributing appropriate decryption keys.

66 Claims, 4 Drawing Sheets

FIG. 1

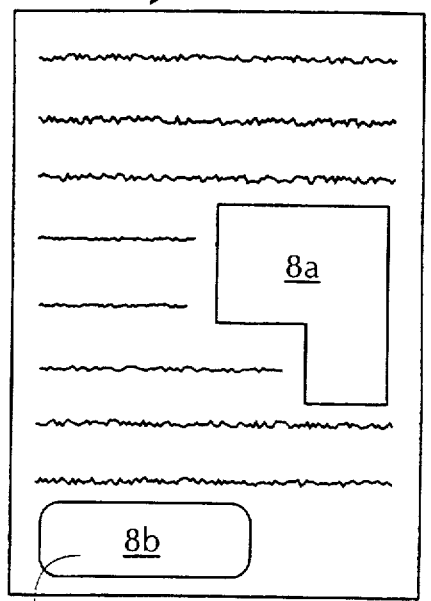

R 007612 CONFIDENTIAL

FIG. 2

PAGE RECORD FIELDS

1. ID NO.
2. REDACTION-EXISTS FLAG ; THIS-IS-IT FLAG
3. PAIRED ID NO.
   (ONLY IF REDACTION EXISTS)
4. REDACTION REASON
   (ONLY IF REDACTION EXISTS)
5. BATES NO.
6. TOTAL NO. OF PAGES IN DOCUMENT
7. PRECEDING SAME-REDACTION-LEVEL PAGE ID NO.
8. NEXT SAME-REDACTION-LEVEL PAGE ID NO.
9. FIRST-LEVEL CONFIDENTIALITY FLAG, CF1
10. SECOND-LEVEL CONFIDENTIALITY FLAG, CF2
11. REDACTION ENCRYPTION & DECRYPTION KEYS
    (ONLY IF REDACTION EXISTS)
12. CONFIDENTIALITY ENCRYPTION & DECRYPTION KEYS
    (ONLY IF CF1=1)
13. AUTHOR
14. DATE
    ⋮

FIG. 3

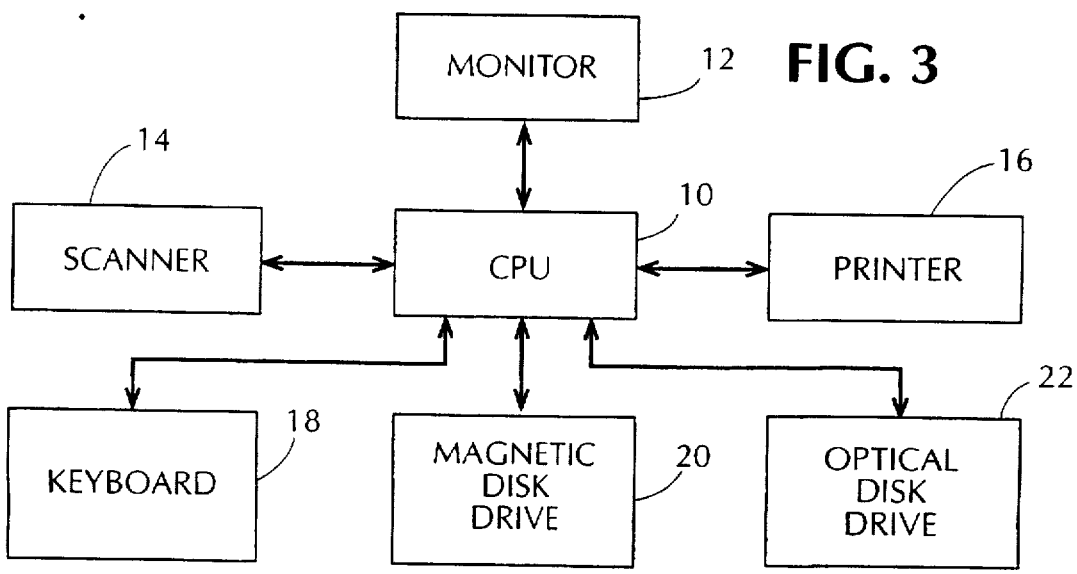

ACCESS CONTROL SYSTEM FOR LITIGATION DOCUMENT PRODUCTION

BACKGROUND OF THE INVENTION

This invention relates to document access control systems, and more particularly to the control of access to documents produced during the course of litigation.

One of the defining features of litigation in this country is the opening up of a party's files to the scrutiny of the opposing party or parties. Soon after the commencement of a lawsuit, a party will often serve upon the other(s) a Request to Produce Documents. Typically, that Request calls for literally tens or hundreds of thousands, and even millions, of documents. A good part of the ensuing litigation revolves around deciding which documents should be produced, stamping them with "Bates number" identifications, redacting parts of documents as being irrelevant or privileged, stamping selected documents with "confidential" legends, preparing privileged logs (lists of documents which are being withheld on the grounds of attorney-client privilege or work product immunity), reviewing produced documents, filing motions concerning the propriety of withholding or redacting documents, etc. Teams of legal assistants and attorneys are assigned to these various tasks. It is commonly accepted that one of the main reasons for the high cost of litigation in the United States has to do with document production.

One way to cut down on the cost of document handling is to produce documents on optical disks. The producing party furnishes to opposing counsel not copies of actual documents, but rather optical disks on which the document images have been stored. The documents are then accessed using an optical disk player. A retrieved document can be viewed on a monitor, and a copy can be printed if desired. One of the biggest advantages of document production on optical disks (besides the savings in rent since it is no longer necessary to allocate a "war room" to the storage of produced paper) is that an associated document database can be developed. A database record can be generated for each page stored on a disk. (As used herein, a "document" can be a single page or a group of related pages. A "page" is a single piece of paper.) The fields of each record can include author, date, addressee, recipients of copies, subject matter, names mentioned, etc. When reviewed by legal assistants or attorneys, individual pages can be annotated and indexed. It is even possible to employ optical character recognition (OCR) techniques so that each page is automatically scanned, and to develop an associated index. With an index, for example, there can be displayed successive images of pages all of which mention a particular person by name, even before analyzing the stored images, and documents dealing with the same subject matter can be linked and viewed simultaneously. The integration of optical disk technology and database management systems, especially in high profile cases, is becoming more common. Service organizations are being established to image the documents and provide turnkey systems for attorney use of the resulting disk images.

One major concern with imaging systems used in document production is that of controlling access to "restricted" documents. Documents can be restricted on two different grounds. The first pertains to redactions. There are many documents which the producing party partially redacts. For example, the same document may pertain not only to the subject matter of the particular lawsuit involved, but also to totally unrelated matters, and should the producing party not desire to turn over information which is not responsive to a document request, it is necessary to mask the irrelevant parts of the document. Similarly, privileged parts of a document may be redacted. Redactions are easily accomplished during the imaging process—blocks of text or other material can be located on a page and replaced by a blank image during the scanning process. But there are two problems with this. First, the producing party generally wants to have an image of the complete, unredacted page, even though the opposing party is given a redacted image; it necessarily complicates the disk-making process if two different sets of disks have to be made, not to mention that producing counsel certainly want to have a record of the redacted image they produced as well as the original. A bigger problem, however, has to do with an eventual Order of a Judge, Magistrate Judge, special master, etc. that a redacted document must be produced in its original form. If all document production is to be done by way of disks, this means that new disks have to be made. Alternatively, paper copies of the original documents can be provided, but they can no longer be integrated in the same database which applies to the documents on disk.

The second document restriction has to do with confidentiality. Very often, a Protective Order is entered into before the start of document production. Under the terms of a typical Order, documents may be marked as confidential, in which case they are not to be shown by receiving counsel to their client. There are even times when there are two levels of confidentiality. For example, a first-level confidential document may be shown to retained experts and consultants, but not the party, while a second-level of "counsel only" confidential documents may not be shown even to the experts. For different "team" members on the same side to be able to work together, they should be able to use copies of the same optical disks, yet there is an obvious roadblock when there are two or three different subsets of documents to which different classes of reviewers are to have access.

What further complicates the confidentiality aspect is that it is routine during the initial stages of litigation to mark many documents as confidential even though they are not. Upon the request of receiving counsel, counsel for the producing party will often acknowledge that a document previously marked as confidential is not, or that a document previously marked as highly confidential is only lowly confidential (i.e., it may be shown to a larger class of people). The question is how documents with different levels of security can all be placed on the same disk or set of disks while selectively restricting access to those documents and, more significantly, how to change permitted access to individual documents in response to attorney agreement or a Court Order.

SUMMARY OF THE INVENTION

Briefly, in accordance with the principles of my invention, a disk produced to the opposing party includes a single image of a full page if that page is not redacted. But if a redacted form of the document is to be produced, the disk includes two images—the complete original document with no redactions, and a redacted form which it is desired to turn over to opposing counsel. The image of the unredacted document is encrypted. Accessing this image in the usual way results in the display of meaningless information. The producing party knows the decryption key for each encrypted image (typically stored in the database record for that image in the file of the producing party); the producing party uses that key to retrieve the encrypted unredacted image. If it is ever necessary to produce a copy of the unredacted image, all that is necessary is for counsel for the producing party to inform opposing counsel of the decryption key for that image. Opposing counsel can then insert the decryption key in the database record associated with the unredacted page in question, and upon retrieval from the disk the decryption key will be used to decrypt the image for display or printing. Each redacted image preferably has its own decryption key so that there may be control of access to pages on a case by case basis. (The exact form of the encryption of the complete, unredacted image on the disk and its subsequent decryption is not important. For example, the individual bits representing the image may be encrypted using any standard cryptographic technique. Alternatively, the pixels representing the unredacted image may themselves not be encrypted, but they may stored in unordered locations on the optical disk, with a decryption key being required to retrieve them in proper order. There are numerous cryptographic schemes which can be employed, and it is well known in the art how to encrypt and decrypt stored images.)

If a document is confidential it may be stored in the usual way, but appropriate flags are placed in the associated database record to represent the confidentiality status. In this case, access to confidential documents is controlled by the operating system. A password is required to enable retrieval of documents characterized by each level of confidentiality, and the passwords are distributed by receiving counsel according to the controlling Protective Order. Control of access to confidential documents thus depends on the integrity of receiving counsel, but that is the case today anyway.

However, even if the confidentiality flags are write-protected, it is not difficult for a party with a computer background to effectively change or bypass a flag, e.g., in memory, in which case a password would not be required to access a confidential document which is made non-confidential in this way. For this reason, the Protective Order may provide that attorneys are not to distribute image disks with confidential documents to any person who is not to have access to such documents. Instead, a disk can be duplicated and any pages whose confidentiality flags in the associated database record represent a specified level of confidentiality can be blanked out. In such a case, passwords would not be required since an unauthorized person would not be given a disk with images of confidential documents in the first place.

The problem with both of these schemes is that often during litigation it is ordered that particular documents originally designated confidential be deemed non-confidential. (Many attorneys initially designate documents as confidential because it is easier not to have to make a decision.) It therefore becomes necessary to change access to confidential documents on a case by case basis. For this reason, the preferred embodiment of my invention entails encrypting confidential images just as the originals of redacted images are encrypted. Access is controlled by turning over the confidentiality decryption key for any document to a person authorized to view it.

If a particular document is to be produced in redacted form and it is also confidential, and one of the first confidentiality-protect schemes (password or disks without confidential documents) is employed, then the document is stored on the disk in both redacted unencrypted form and unredacted encrypted form using a redaction encryption key; the flags in both associated records are the same, representing the same level of confidentiality. Should a redacted, confidential document have to be produced in unredacted form, but still on a confidential basis, producing counsel need only turn over to receiving counsel the redaction decryption key. Counsel for the receiving party, who are given the confidentiality password at the start of the production process, and/or who have disks with all documents stored thereon, can then use the decryption key to retrieve the full unredacted image. But a person who does not have access to confidential documents, and who is not provided with the confidentiality password and/or images of confidential documents in the first place, still has no access to the full image (or even the redacted image). When using the preferred scheme, however, in which confidential documents are also encrypted, some images will be doubly encrypted. It is a simple matter to encrypt or decrypt the same image with two keys, as is well known in the art. It is to be understood that together with the optical disks, the producing party provides the database file, e.g., on magnetic disk, which includes the confidentiality decryption key for each encrypted confidential image so that receiving counsel can image the confidential documents. A database file without the confidentiality decryption keys may be furnished to all those persons who want to review documents but who are not to have access to confidential documents. (Even though database records may not be necessary for imaging non-confidential documents, even furnishing a "blank" database record is advantageous should the reviewing party want to annotate the documents as will be described below.) If there are two levels of confidentiality, it is still sufficient to provide just one decryption key—it is just a matter of who is given the key. But no matter who has the confidentiality decryption key, the full original of a redacted image cannot be retrieved without the redaction decryption key.

In an extreme case in which it is ordered that a document which is both redacted and confidential be made fully available to everyone, all that is required is to distribute both the redaction decryption key and the confidentiality decryption key for that document. The point is that by storing on the disk redacted and unredacted forms of an original page, and controlling access by the distribution of redaction and confidentiality decryption keys in database records, it is possible to control throughout a litigation a particular person's changing access to particular documents.

BRIEF DESCRIPTION OF THE DRAWINGS

Further objects, features and advantages of the invention will become apparent upon consideration of the following detailed description, in conjunction with the drawing, in which:

FIG. 1 depicts the form of a page of a document as it might be produced today, during litigation, in paper form;

FIG. 2 lists the fields in each record associated with a page stored on an optical disk;

FIG. 3 is a block diagram of the equipment which is used in accordance with the invention, both for making optical disks containing images of documents to be produced, and for accessing the resulting images;

DETAILED DESCRIPTION OF THE PREFERRED EMBODIMENT

Figure 4A:
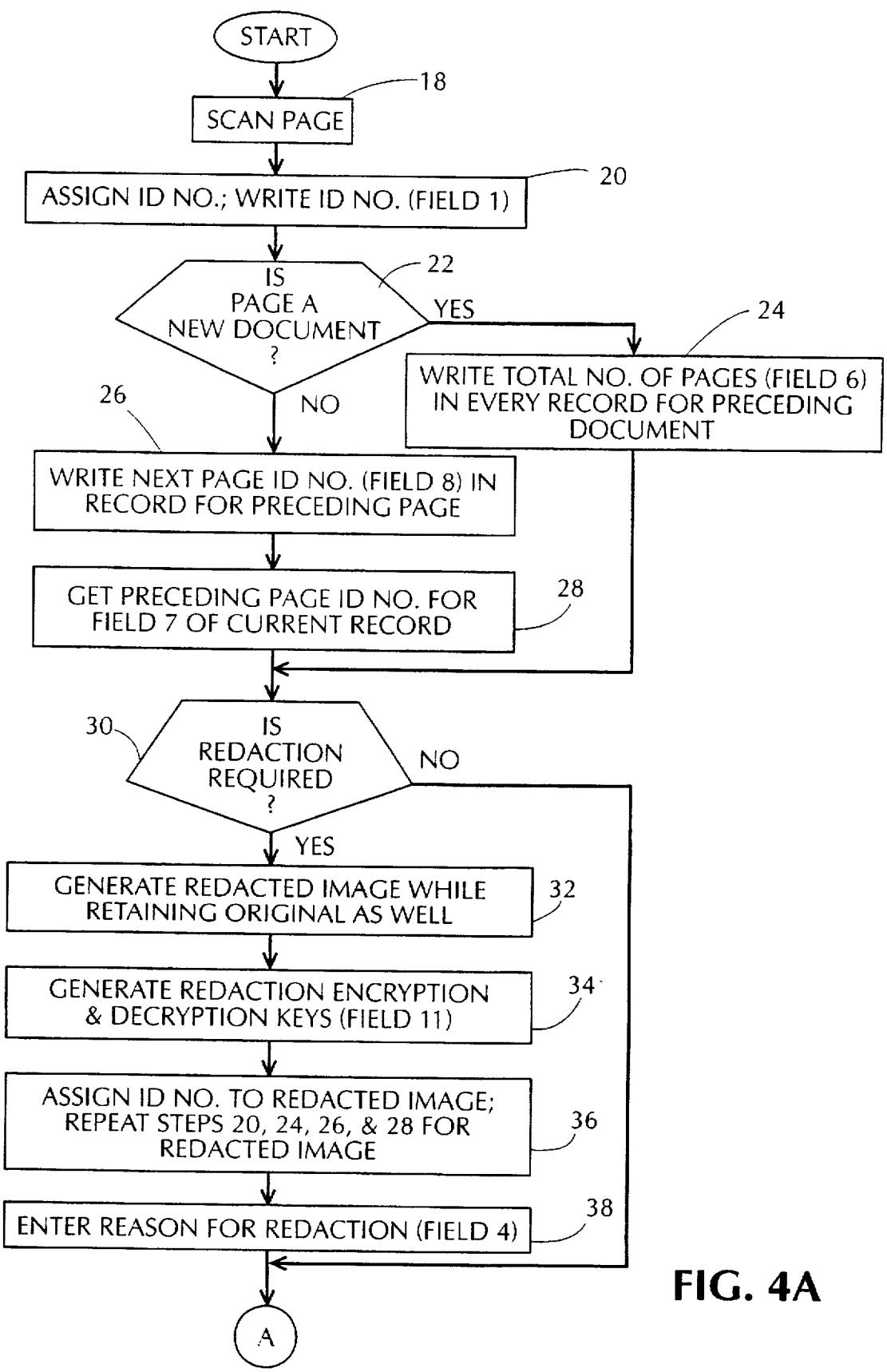
FIGS. 4A and 4B comprise a flowchart of the steps in the method of creating a master optical disk for use by the producing party.

Although the following description is in the context of producing documents in litigation, the principles of the invention are applicable wherever documents are to be distributed in redacted form or on a restricted-access basis, and there may be a need to furnish greater access to particular individuals as time goes by.

As depicted in FIG. 1, a typical page produced to opposing counsel in litigation is a copy of an original document with perhaps redactions or additions. The typical form of redaction is shown by the numeral 8a, an area of text or drawing which has been made all white or all black. This is most readily accomplished on the copying machine itself which is used to make the copy; sophisticated copying machines include the capability of redacting a selected area on the copy. The area 8b in FIG. 1 often contains two pieces of added information, shown in enlarged form at the bottom of the drawing. First, an identification number, called a "Bates number" after the machine which is often used to stamp the number on the page, is placed so that it does not obscure the text. The number very often includes one or more letters, followed by a numeral. If there is a legend to be placed on the page, such as "confidential" as shown in FIG. 1 (although the legend is quite often longer), it should also be placed at a position where it does not obscure the text. The legend is typically placed on the page simply by using a stamp specially made for the purpose. There are other ways in which the Bates number (used in a generic sense) or legend may be placed on the sheet, including the use of stick-on labels, and copying machines which generate additional text or numerals.

The hardware of my invention, shown in FIG. 2, consists of conventional components. The system is controlled by a CPU 10. Monitor 12, keyboard 18, magnetic disk drive 20 and printer 16 are conventional components to be found in practically every personal computer system. Optical disk drive 22, which has both a write and read capability, is similarly conventional in every respect; such drives are available at the present time at a cost of no more than a few thousand dollars. Scanner 14 is also a standard component and functions to digitize a document whose image is to be recorded on an optical disk. CPU 10 can be used to control the recorded image by adding a "confidential" legend, a Bates number, redactions and encryption of the image. The individual hardware components and method steps of my invention are all conventional.

As will be described below, the method of the invention can be best implemented by the party producing documents first recording an optical disk, a master, for his/her own use. From this disk a copy, but a copy with differences, is made to be produced to opposing counsel. (Similarly, the database associated with the master disk is copied for the opposing party, but with changes.) in order to make a copy of one disk from another, optical disk drive 22 preferably includes the capability of reading from one optical disk and writing on another; in the alternative, two drives can be used under control of CPU 10.

In the illustrative embodiment of the invention, the database records associated with the pages on optical disk include a number of fields, which fields preferably are the same for all parties and for all copies of the optical disks. As will become apparent below, the producing party has a disk which is not necessarily the same as the one furnished to opposing counsel, but for any disk image the associated database record preferably contains the same fields, no matter whose copy of the optical disk is involved. This is most advantageous if the parties agree in advance that they will both (or they will all, if there are multiple parties) produce documents in the same form, and with the same database fields, so that at least the "templates" for the database records come with the optical disks ready to be filled in by the individual parties. (Because it is a trivial matter to add fields to database records, it is not really necessary that all databases start out with the same record fields.) FIG. 3 depicts the record fields used in the illustrative embodiment of the invention.

Field 1 is an identification number. This number is not the Bates number which may be on the page image. In fact, it may not be necessary to place Bates numbers on the images themselves, provided the parties agree that the disk identification numbers will be used to identify documents. The ID number in field 1 simply points to the location or address on a disk where a particular image is to be found.

Field 2 consists of two bits, a redaction-exists flag, and a this-is-it flag. The former flag is a 1 if the document is being produced to opposing counsel in redacted form. As discussed above, what is actually produced is an image pair—an encrypted unredacted image, and an unencrypted redacted image. (Even the latter image may have been encrypted with a confidentiality encryption key, and the former image may have been doubly encrypted if it is confidential.) The second flag identifies a particular image as one of these two forms. If the this-is-it flag is a 1, then the associated image is in redacted form; if the flag is a 0, then the associated image is not redacted (although it will be encrypted). If the redaction-exists flag is a 0, then there is only one associated (unredacted) image, and the value of the this-is-it flag is irrelevant.

If there is a redaction of an original page, then the disk produced to opposing counsel includes two images. In order to relate those two images to each other, field 3, which is non-zero only if there is a redaction in the first place (as represented by the redaction-exists flag), contains the ID number of the paired image. Thus if the subject image is not redacted and it is stored at an address represented by the ID number in field 1, then field 3 will contain the ID number of the redacted image. Conversely, if the location represented by the ID number in field 1 contains the redacted image, then the location identified by the ID number in field 3 contains the unredacted image.

When a document is redacted, sooner or later there is a demand for an explanation. The explanation (only if a document is redacted) is placed in field 4, if desired. In this way, opposing counsel can be furnished with the reason for the redaction at the time of document production. On the other hand, the producing party may want to make a record of the reason for the redaction, without actually telling opposing counsel, in which case field 4 is simply left blank in the copy of the database furnished to opposing counsel. Code words, e.g., irrelevant, can be used, or more descriptive explanations can be provided. In the absence of a redaction, field 4 is left blank. The redaction reason can be provided in the record for both the redacted and unredacted images, in only one of the records, or neither.

If Bates numbers have been placed on documents, then the Bates number of the subject page may be entered in field 5 of the record. This is a convenient way to tie disk location ID numbers and document-stamped Bates numbers to each other. (It might be thought that there is no reason to use Bates numbers since every document is uniquely identified by an ID number. However, one advantage in actually stamping each document, and doing so on the actual documents retained by the producing party, is that if the production has to be updated as the litigation progresses, it may be readily determined which documents have already been produced when reviewing the producing party's files once again.) Once again, and this applies to most of the fields depicted in FIG. 2, the Bates number information can be provided in both database records in the case of a redacted document.

In order to automate document control, it is convenient to group pages together if they are in the same document. For example, all pages of a single letter should be grouped together as a single document. This does not mean that the individual pages must be stored on a disk in successive locations. Were this required, it would not be possible to add to a document if a missing page is found. Instead, what is required is a way to link the individual pages of a single document. Field 6 includes a number which represents the total number of pages in the document which includes the page associated with the subject database record. Field 7 identifies the ID number of the preceding page (if any) in the same document. Because there are redacted and unredacted documents which can be stored on the disk, the preceding page ID number identifies the page in the same-redaction-level document. For example, if the current page is in the redacted form of the document, then field 7 will represent the disk location of the preceding page in the redacted document. In order to maintain the linking of pages in the same document, assuming that this is desired, if even a single page in a document is redacted, then all pages should be placed on the disk twice, once as part of a redacted form of the document, and once as part of an unredacted form of the document, even though individual pages in the redacted form might themselves be unredacted. Field 8 is comparable to field 7, except that it contains the ID number of the next page (if any) in the document of the same redaction level.

In the illustrative embodiment of the invention, there are two levels of confidentiality. Field 9 contains a first-level confidentiality flag, CF1. If the single bit in this field is a 0, it means that even the requesting party can look at the document. If the bit is a 1, it might mean that no employees or agents of the requesting party may have access to the document, but that independent experts/consultants can look at it. The second-level confidentiality flag, CF2, in field 10, represents a higher level of confidentiality. If this flag is a 0, it means that the confidentiality level represented by a 1 in field 9 is intended to create only two classes of document reviewers, those who have access to all documents, and those who have access only to non-confidential documents. But if the bit in field 10 is a 1, then it means that: there are three groups of people, those who can look at all confidential documents (e.g., counsel for the requesting party), those who do not have access to high-level confidential documents (e.g., consultants), and those who have access to no confidential documents. The two flags, CF1, CF2 simply identify the particular page as being in one of three possible subsets of documents.

Thus far it has been said that a non-confidential image which is to be redacted is produced in its redacted form without any encryption, but the original image is produced, in its entirety, in encrypted form. (Although it is possible to encrypt only the redacted portion of an image, it is simpler to produce on disk the entire unredacted image in encrypted form.) If redaction of a page is to be effected, then the producing party requires both encryption and decryption keys, an encryption key in order to store the original form of the page, and a decryption key to retrieve this complete page (the key to be given to the receiving party only if it is later determined that the document should be produced in unredacted form). The encryption and decryption keys are stored in field 11. Obviously, the database, when first turned over to the receiving party, does not include any keys in field 11.

Field 12 similarly includes confidentiality encryption and decryption keys for the stored image, but only if CF1=1 to represent that the document is confidential. The decryption key may be given to any party who is to have access to the document. (Although receiving counsel only requires the decryption key, both keys can be placed in the field for the benefit of the producing party, as will be described below, and it does not change things if receiving counsel is given the encryption key as well as the decryption key.)

Following field 12, the customary fields used to summarize documents can be provided. These include author, date, recipients, summary, etc. Such fields are well known to hordes of legal assistants and young law firm associates who analyze and index produced documents.

Figure 4B:
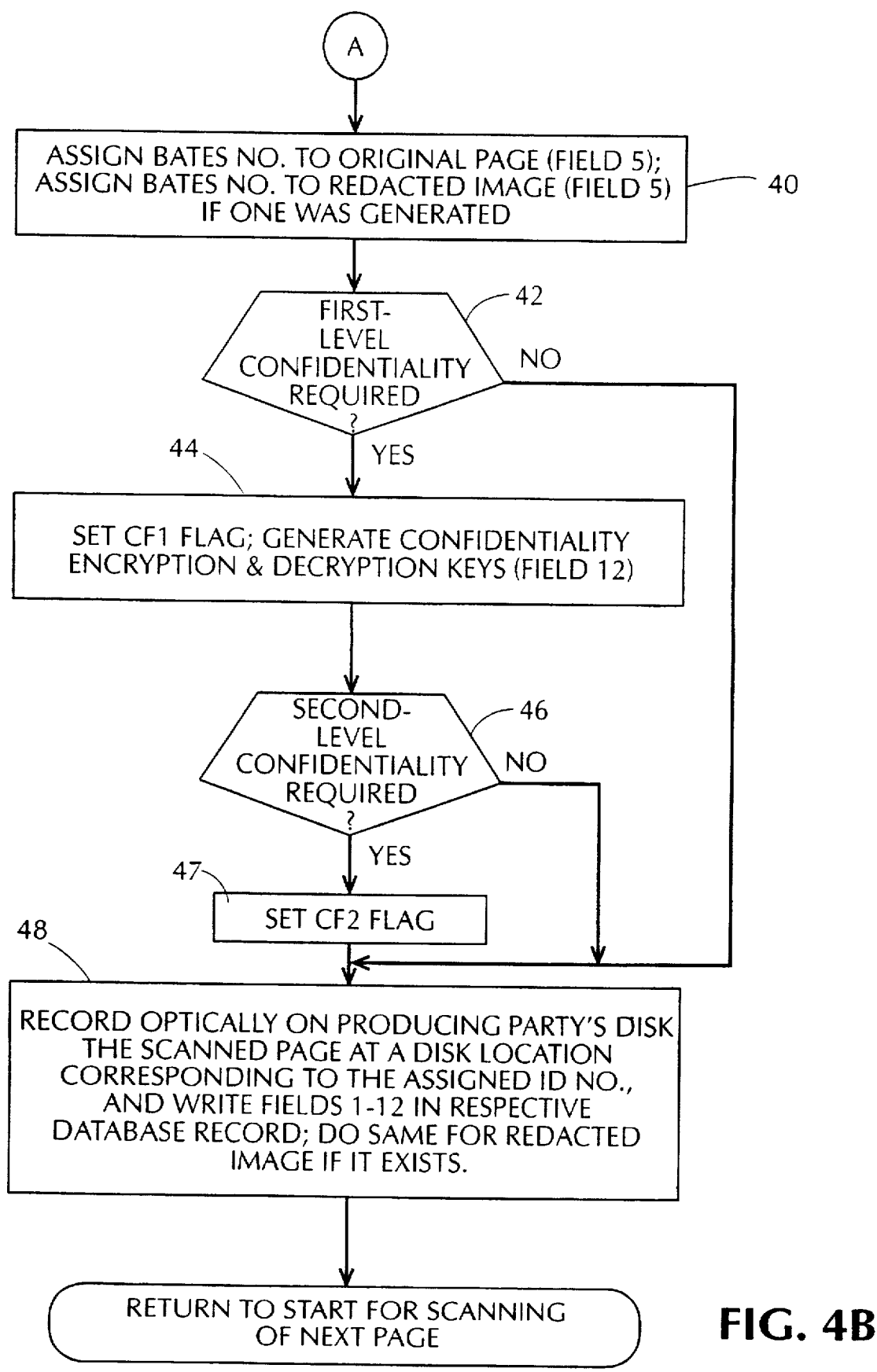

The flowchart of FIGS. 4A and 4B depict the steps in creating the master optical disk and master database for use by the producing party. In step 18 a page is scanned. An ID number (optical disk location) is then assigned to the page, and this ID number is written in field 1 of the associated database record. The operator is asked in the next step whether the page represents a new document, or is simply part of a document which is already being scanned. If the page is a new document, it means that the previously scanned page was the last page in the preceding document. The system counts the number of pages which are scanned following a "yes" answer to the question in step 22. When the start of the scan of a new document is determined, in step 24 the previously maintained count is written into field 6 of every record associated with a page in the immediately preceding document. On the other hand, if the page does not represent a new document, it is not possible to fill in field 6 in each of the records associated with the pages in the document being processed because the total number of pages in the document is not yet known. However, the record for the previously scanned page is supposed to have in its field 8 the page ID number (location on the optical disk) where the page being processed is stored. Therefore, field 8 in the record for the previously scanned page is written in step 26 once it is known where the present page is being stored on the optical disk. Field 8 of the current record is not completed until the next page is scanned and it is determined where on the disk it is to be stored. It should be noted that the last page of any document has a record with no entry in field 8 since there is no subsequent page in the document which is scanned and causes field 8 of a previously processed record to be written.

The record associated with each scanned page also includes a field 7 which links the page to the preceding page in the same document. (All processing at this stage is for the unredacted image of the page being scanned.) If the page being scanned is the first in a new document, then there is no preceding page to which the current page has to be linked. Consequently, field 7 for the current record remains blank. However, if the current page is not the first in the document being scanned, it must be linked to the preceding page. In field 7 of the current record, there is now written, in step 28, the page ID number in the record associated with the preceding page. It should be noted, therefore, that field 7 of any record (except that for the first page of a document) contains the same entry as field 1 of the preceding record, and field 8 of any record (except that for the last page of a document) contains the same data as field 1 of the succeeding record.

In step 30 the operator is asked whether redaction of the page being scanned is required. If redaction is not required, the system advances to step 40. But if redaction is required, then in step 32 an image is created which is a redacted form of the original. The original image is retained along with the redaction. Standard software can be used for this purpose. For example, many copying machines include the capability of redacting selected parts of a document. (It is possible to record only unredacted images in the first pass, and to do all redactions after unredacted originals are first stored on the optical disk. This is because it is not necessary that unredacted and redacted forms of the same image have successive ID numbers on the disk. An advantage of this approach is that low-level employees can image all documents without regard to redactions, only following which are the documents reviewed on the monitor and redacted images made if necessary. On the other hand, an advantage of having an attorney or a legal assistant doing the redactions at the same time that the original imaging takes place is that it may be decided that many documents do not have to be produced and imaged in the first place if they are actually reviewed at the time of initial imaging.)

If the page under consideration is to be redacted, it is necessary to generate a redaction encryption key and a redaction decryption key. This is accomplished in step 34. It should be appreciated that the redaction encryption key is used during the imaging of the unredacted image, and the redaction decryption key is ultimately used to retrieve this unredacted image. The redacted image itself it stored in unencrypted form.

In step 36, an ID number is assigned to the redacted image. When the redacted image will ultimately be stored on the optical disk, the corresponding database record will be written on the magnetic disk. The record for the unredacted image has thus far had fields 1, 6, 7 and 8 determined. In step 36, steps 20, 24, 26 and 28 are repeated for the record to be associated with the redacted page. For example, the ID number for the redacted page (the location on the optical disk where the redacted image will be stored) is determined for field 1 of the record, the total number of pages is determined for field 6 if that determination can now be made, etc. It should be noted that the link pointers in fields 7 and 8 for the record of the redacted image are different from the corresponding fields in the record for the unredacted image. That is because these fields point to pages in documents of different redaction levels. The pages in any document which has any redaction are linked together, as are the pages in any unredacted document.

In step 38 the operator is asked the reason for the redaction. This reason can be stored in field 4 of both records if desired. Alternatively, it can be stored in only one of the records or neither. Of course, field 4 remains blank if in step 30 the system is informed that a redaction is not required in the first place.

In step 40 a Bates number is assigned to the original page, and a Bates number is assigned to the redacted image if one was generated. These number(s) are used in field 5 of the single record if there is no redaction, and the two respective records if a redaction is generated. The Bates numbers can be machine generated, or inputted by an operator if the page being scanned already has a Bates number. Different Bates numbers can be used for the two forms (redacted and unredacted) of the same image, although it is possible to use the same Bates number for both the unredacted and redacted images if that is desired. It should also be appreciated that if a confidentiality legend is to be placed on an image by the system, as opposed to being manually stamped, the operator can be asked to do so at this point and can use the monitor to point to a location on the image where the legend is to be placed. In step 42, the operator is asked whether first-level confidentiality is required for the page under consideration.

This is the lowest level of confidentiality, and the answer to the question is in the affirmative if any level of confidentiality is required. If the page in question is confidential, it will be imaged, at least on the disk furnished to the other party, in encrypted form only; if there is a redacted as well as an unredacted version, both will be encrypted. In step 44 the confidentiality encryption and decryption keys are generated. The first-level confidentiality flag CF1 is set for field 9 of the record, and the confidentiality encryption and decryption keys are determined for recording in field 12.

In step 46 the operator is asked whether the second level of confidentiality applies to the page in question, for example, whether it is for "counsel only." The answer determines whether the second-level confidentiality flag CF2 is set in field 10. Of course, it is to be understood that if there is only one level of confidentiality for the document production in question, then there would be only one confidentiality flag and field.

Finally, in step 48 one or two images are stored on the optical disk, and one or two records are written on the magnetic disk. The locations at which the images are stored are determined by the respective ID numbers in the first fields of the two records. Field 2 of each record consists of two flags, as discussed above. If there is no redacted image, then the unredacted image is recorded alone, and the redaction-exists flag in the corresponding record is set to 0. If there is a redaction, however, the redaction-exists flag is set to 1 in each of the records. In this case, the this-is-it flag is set to 0 in one case and 1 in the other, to indicate which image is unredacted and which is redacted. If a redaction exists, each record has the ID number of the other image stored in its field 3. The other fields have already been determined as described above, and can now be recorded in the corresponding records. The remaining fields of the records—author, date, comments, etc.—can be written at a later time when the documents are analyzed in detail.

The system then returns to the start of the flowchart and the scanning of another page.

Figure 5:
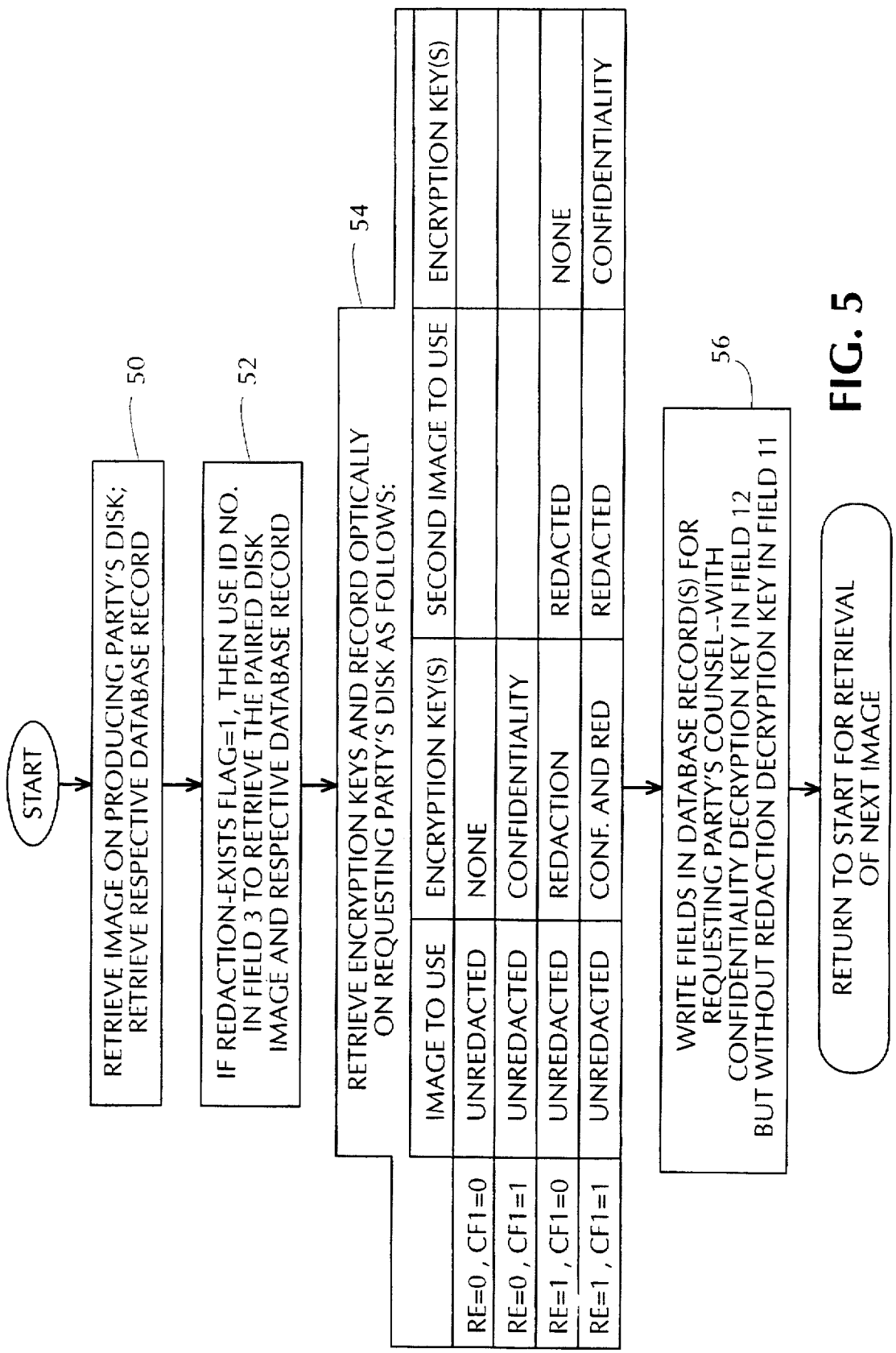
FIG. 5 is a flowchart illustrating the steps in the method of producing, from the master optical disk, an optical disk to be produced to opposing counsel.

FIG. 5 is a flow chart which depicts how the image disk and database for the opposing party may be generated. In step 50 an image on the producing party's master disk is retrieved, as is the corresponding database record. The images may be retrieved in the order of the ID numbers, with a return being made to the start of the flowchart after a complete image (or pair of images in the case of a redaction) is processed.

In step 52 the redaction-exists flag in field 2 of the database record is examined. If the flag is a 1 to indicate that a redaction exists, field 3 is examined to determine the location of the paired disk image and the respective database record. Since field 3 of any record identifies the paired image, whether the record being examined is associated with the redacted or unredacted form of the page, it makes no difference which of the two images is accessed first. In either case, if a redaction exists, the paired images and the paired database records are retrieved. (The system maintains a list of all images on the master disk which are processed so that paired images are not recorded twice on the optical disk being made.)

In step 54, the system determines from the retrieved database record, or retrieved database records in the case of two images, what should be recorded on the optical disk to be produced to the opposing party and what information should be written in the corresponding database to be furnished with the optical disk. The chart in FIG. 5 provides the necessary information. If the redaction-exists (RE) flag is a 0, it means that there is only one image of the subject page recorded on the master optical disk. If the first-level confidentiality flag CF1 is also a 0, it means that not only has the page been imaged without redactions, but the page is not confidential. As indicated in the chart, the image on the master disk which should be used to make a corresponding copy on the disk for opposing counsel is the original unredacted image, and there are no encryption keys which are involved.

As indicated in the second row of the chart, if CF1=1 when RE=0, it is an indication that there is only one image recorded because there was no redaction, but it is confidential. In such a case the original unredacted image is recorded, but the confidentiality encryption key is used. It should be understood that in the illustrative embodiment of the invention the master disk has the image recorded without encryption, although an encryption key is in field 12 of the master database record. (While an encrypted form of the image could also be recorded on the master disk, there is no reason to do so.) When making a corresponding image on the disk to be produced for the opposing party, the encryption key is retrieved from the master database record and used to encrypt the original image. Thus what the receiving party is given is an encrypted image which cannot be accessed because while the decryption key is stored in field 12 along with the encryption key in the database record of the producing party, the corresponding database record given to the opposing party does not include any keys in field 12. Only opposing counsel is furnished the confidentiality decryption key. It is only if it is subsequently ordered or agreed that the receiving party is to have access to the confidential document that he is given the decryption key so that the encrypted image can be retrieved. The producing party is thus able to control access to documents on an individual basis simply by turning over the key necessary to decrypt any specific confidential image on the produced disk.

While the image can be retrieved by counsel for the receiving party because his database record includes the confidentiality decryption key, persons who are not to have access to confidential documents are not furnished database records with this key. The confidentiality decryption keys (it is to be recalled that preferably there is a different encryption/decryption key pair for each page, or at least each document) are readily controlled from the point of view of access. Three versions of the database may be prepared on different magnetic disks. A first version would include no confidentiality keys at all. Such a database could be furnished to any person who is not to have access to confidential documents. As for the two other versions of the database, one of them includes all of the confidentiality decryption keys. This database is furnished, for example, to opposing counsel who are to be given access to confidential documents and therefore require the confidentiality decryption keys. The third database includes confidentiality decryption keys only for low-level confidential documents, e.g., documents which may be reviewed by experts but not the opposing party. Such a document is represented by the combination CF1=1 and CF2=0 (confidential but not of the highest level). Only a record which has this flag combination has the corresponding confidentiality decryption key in field 12 so that experts and the like can have access to the corresponding low-level confidential document.

The third entry on the chart is the case where RE=1 and CF1=0. This means that there is a redaction so that there are two images recorded on the master disk, but that they are not confidential. Two images are recorded on the produced disk. The first is the unredacted image. Since the receiving party is not to have a copy of the unredacted image, the image is recorded in encrypted form. The redaction key in field 11 is used and the entire original document is imaged but in encrypted form. This means that the receiving party cannot retrieve the full image because he is not given the redaction decryption key. Only at such time that the producing party is ordered or agrees to furnish an unredacted copy is the redaction decryption key given to the receiving party and his counsel. At that time the full image can be retrieved. Until that time, or if it never happens, even receiving counsel has access to only the redacted image. This is the second image which is recorded as shown in the chart, and no key is used. The redacted image on the master disk is simply copied.

The last case is where RE=1 and CF1=1. This means that not only are redacted and unredacted images stored on the master disk, but they are both confidential. The first image which is recorded is a doubly encrypted image—the unredacted original page is encrypted with both the redaction key in field 11 of the database record and the confidentiality key in field 12. The corresponding database record which is provided to the receiving party has no keys in fields 11 and 12. The only way that the receiving party can see the full image is to be furnished with both keys.

It should be appreciated that even though counsel for the receiving party may be given the confidentiality decryption key, there is still no access to the unredacted document because it is doubly encrypted and the redaction decryption key is not furnished. Only at such time that the unredacted copy is to be made available is the key turned over.

The second image which is recorded is the confidential redacted image which can be viewed by opposing counsel. Because the redacted image is confidential, it is stored in encrypted form. Once again, three versions of the database may be generated, with the confidentiality decryption key being included in a particular record depending upon the states of the confidentiality flags and for whom the database is intended.

In step 56, one or two database records are recorded for opposing counsel depending upon whether one or two images are stored on the optical disk. (Databases with different confidentiality statuses, as just described, can be prepared after the most comprehensive, for opposing counsel, is generated.) Any database record furnished to opposing counsel may be the same as that of the producing party with the exception of fields 11 and 12. No keys are stored in field 11. While the producing party has both the encryption and decryption keys necessary for storing and retrieving unredacted documents, these are not furnished to the other side; the redaction decryption keys are furnished only when it is determined subsequently that access to the unredacted document is to be allowed. As for field 12, a record in the database of the producing party has the confidentiality encryption and decryption keys for the associated page, but the database record for opposing counsel can include only the decryption key. (The encryption key is never needed by receiving counsel.) This database is for use by opposing counsel only. If the database is to be furnished to the client or an expert, then the two other versions of the database discussed above must first be generated as required prior to distribution.

At the end of the processing of any image (or pair of images), a return is made to the start of the flowchart for retrieval of the next image on the producing party's disk and its processing and copying on the disk being made for requesting counsel.

The system of the invention is easily implemented. Where it differs from the prior art is in what gets recorded in the archival storage media and who has decryption keys. The decryption keys can be communicated by modem, for example, for ultimate representation in system memory so that they can be used in the decryption process.

Although the invention has been described with reference to a particular embodiment, it is to be understood that this embodiment is merely illustrative of the application of the principles of the invention. For example, instead of associating records with pages, it is possible to associate records with documents (no matter how many pages there are in a document). And instead of using optical disks, other archival storage media can be used, e.g., magnetic disks (a 1-Gigabyte hard drive can store a considerable quantity of images, especially if they are in compressed form). Thus it is to be understood that numerous modifications may be made in the illustrative embodiment of the invention and other arrangements may be devised without departing from the spirit and scope of the invention.

What is claimed is:

1. A method of controlling access to documents produced in litigation comprising the steps of:
    (a) storing images of documents on an optical disk, at least some of said images being in unredacted encrypted form, at least some of said images being, in redacted unencrypted form, and at least some of said images being unredacted and unencrypted,
    (b) associating database records with said stored images, the record for each image containing multiple fields whose entries characterize the image,
    (c) for any unredacted encrypted image that is to be retrieved, storing the appropriate decryption key in a field of the associated record, and
    (d) furnishing such an image decryption key only to those persons who are to have access to the corresponding unredacted image.

2. A method in accordance with claim 1 further including the step of storing on the optical disk, in a paired relationship, unredacted encrypted and redacted unencrypted forms of the same image.

3. A method in accordance with claim 1 further including the step of writing in the database record for each stored image data identifying whether the stored image is to be treated as confidential material.

4. A method in accordance with claim 3 further including the step of writing in the database record for any stored image which is to be treated as confidential material data representative of the level of confidentiality.

5. A method in accordance with claim 4 further including the step of storing on the optical disk in encrypted form, using a confidentiality encryption key, each image which is to be treated as confidential material.

6. A method in accordance with claim 5 further including the step of creating a file of database records which includes all decryption keys corresponding to the encryption keys used to store images on the optical disk.

7. A method in accordance with claim 6 further including the step of creating another file of database records which includes all decryption keys corresponding only to the encryption keys used to store images which are to be treated as confidential material.

8. A method in accordance with claim 5 further including the step of creating two files of database records each of which includes all decryption keys corresponding to the confidentiality encryption keys used to store images which have a respective level of confidentiality, and selectively distributing such two files to persons who have access to images having the respective levels of confidentiality.

9. A method in accordance with claim 1 further including the step of storing on the optical disk in encrypted form, using a confidentiality encryption key, each image which is to be treated as confidential material.

10. A method in accordance with claim 9 further including the step of creating two files of database records each of which includes all decryption keys corresponding to the confidentiality encryption keys used to store images which have a respective level of confidentiality, and selectively distributing such two files to persons who have access to images having the respective levels of confidentiality.

11. A method of controlling access to documents comprising the steps of:
    (a) storing images of documents on an optical disk, at least some of said images being in unredacted encrypted form, at least some of said images being in redacted unencrypted form, and at least some of said images being unredacted and unencrypted,
    (b) associating database records with said stored images, the record for each image containing multiple fields whose entries characterize the image,
    (c) for any unredacted encrypted image that is to be retrieved, storing the appropriate decryption key in a field of the associated record, and
    (d) furnishing such an image decryption key only to those persons who are to have access to the corresponding unredacted image.

12. A method in accordance with claim 11 further including the step of storing on the optical disk, in a paired relationship, unredacted encrypted and redacted unencrypted forms of the same image.

13. A method in accordance with claim 12 further including the step of writing in the database record for each stored image data which links that image to other stored images in the same document.

14. A method in accordance with claim 13 wherein any image which is stored in redacted form and which is to be treated as confidential material is stored encrypted with use of a confidentiality encryption key.

15. A method in accordance with claim 12 further including the step of writing in the database record for each stored image data identifying whether the stored image is to be treated as confidential material.

16. A method in accordance with claim 15 further including the step of writing in the database record for any stored image which is to be treated as confidential material data representative of the level of confidentiality.

17. A method in accordance with claim 12 further including the step of storing on the optical disk in encrypted form each image which is to be treated as confidential material.

18. A method in accordance with claim 17 wherein any image which is stored in unredacted encrypted form and which is also to be treated as confidential material is stored further encrypted with use of a confidentiality encryption key.

19. A method in accordance with claim 18 wherein any image which is stored in redacted form and which is to be treated as confidential material is stored encrypted with use of a confidentiality encryption key.

20. A method in accordance with claim 17 further including the step of creating a file of database records which includes all decryption keys corresponding to the encryption keys used to store images on the optical disk.

21. A method in accordance with claim 20 further including the step of creating another file of database records which includes all decryption keys corresponding only to the encryption keys used to store images which are to be treated as confidential material.

22. A method in accordance with claim 12 wherein any image which is stored in unredacted encrypted form and which is also to be treated as confidential material is stored further encrypted with use of a confidentiality encryption key.

23. A method in accordance with claim 12 further including the step of creating a file of database records which includes all decryption keys corresponding to the encryption keys used to store images on the optical disk.

24. A method in accordance with claim 23 further including the step of creating another file of database records which includes all decryption keys corresponding only to the encryption keys used to store images which are to be treated as confidential material.

25. A method in accordance with claim 11 further including the step of writing in the database record for any stored image which is to be treated as confidential material data representative of the level of confidentiality.

26. A method in accordance with claim 11 further including the step of storing on the optical disk in encrypted form each image which is to be treated as confidential material.

27. A method of controlling access to documents comprising the steps of:
   (a) storing images of documents, at least some, but not all, of said images being in unredacted encrypted form,
   (b) associating database records with said stored images, the record for each image containing multiple fields whose entries characterize the image,
   (c) for any unredacted encrypted image that is to be retrieved, storing the appropriate decryption key in a field of the associated record, and
   (d) furnishing such an image decryption key only to those persons who are to have access to the corresponding unredacted image.

28. A method in accordance with claim 27 further including the step of storing, for an unredacted encrypted image, an additional redacted unencrypted form of the image.

29. A method in accordance with claim 28 further including the step of writing data in appropriate fields of said database records which relate to each other the unredacted and redacted forms of the same stored image.

30. A method in accordance with claim 29 further including the step of writing in the database record for each stored image data which links that image to other stored images.

31. A method in accordance with claim 30 further including the step of writing in the database record for each stored image data identifying whether the stored image is to be treated as confidential material.

32. A method in accordance with claim 31 further including the step of writing in the database record for any stored image which is to be treated as confidential material data representative of the level of confidentiality.

33. A method in accordance with claim 31 further including the step of storing in encrypted form each image which is to be treated as confidential material.

34. A method in accordance with claim 33 wherein any image which is stored in unredacted encrypted form and which is also to be treated as confidential material is stored further encrypted with use of a confidentiality encryption key.

35. A method in accordance with claim 34 wherein any image which is stored in redacted form and which is to be treated as confidential material is stored encrypted with use of a confidentiality encryption key.

36. A method in accordance with claim 35 further including the step of creating a file of database records which includes all decryption keys corresponding to the encryption keys used to store images.

37. A method in accordance with claim 36 further including the step of creating another file of database records which includes all decryption keys corresponding only to the encryption keys used to store images which are to be treated as confidential material.

38. A method in accordance with claim 28 further including the step of writing in the database record for any stored image which is to be treated as confidential material data representative of the level of confidentiality.

39. A method in accordance with claim 28 further including the step of storing in encrypted form each image which is to be treated as confidential material.

40. A method in accordance with claim 39 wherein any image which is stored in unredacted encrypted form and which is also to be treated as confidential material is stored further encrypted with use of a confidentiality encryption key.

41. A method in accordance with claim 40 wherein any image which is stored in redacted form and which is to be treated as confidential material is stored encrypted with use of a confidentiality encryption key.

42. A method in accordance with claim 41 further including the step of creating a file of database records which includes all decryption keys corresponding to the encryption keys used to store images.

43. A method in accordance with claim 42 further including the step of creating another file of database records which includes all decryption keys corresponding only to the encryption keys used to store images which are to be treated as confidential material.

44. A method in accordance with claim 28 wherein any image which is stored in redacted form and which is to be treated as confidential material is stored encrypted with use of a confidentiality encryption key.

45. A method in accordance with claim 44 further including the step of creating a file of database records which includes all decryption keys corresponding to the encryption keys used to store images.

46. A method in accordance with claim 45 further including the step of creating another file of database records which includes all decryption keys corresponding only to the encryption keys used to store images which are to be treated as confidential material.

47. A method in accordance with claim 27 further including the step of writing in the database record for any stored image which is to be treated as confidential material data representative of the level of confidentiality.

48. A method in accordance with claim 27 further including the step of storing in encrypted form each image which is to be treated as confidential material.

49. A method in accordance with claim 48 wherein any image which is stored in unredacted encrypted form and which is also to be treated as confidential material is stored further encrypted with use of a confidentiality encryption key.

50. A method in accordance with claim 49 further including the step of creating a file of database records which includes all decryption keys corresponding to the encryption keys used to store images.

51. A method in accordance with claim 50 further including the step of creating another file of database records which includes all decryption keys corresponding only to the encryption keys used to store images which are to be treated as confidential material.

52. A method in accordance with claim 48 further including the step of creating a file of database records which includes all decryption keys corresponding to the encryption keys used to store images.

53. A method in accordance with claim 52 further including the step of creating another file of database records which includes all decryption keys corresponding only to the encryption keys used to store images which are to be treated as confidential material.

54. A method in accordance with claim 27 wherein any image which is stored in unredacted encrypted form and which is also to be treated as confidential material is stored further encrypted with use of a confidentiality encryption key.

55. A method in accordance with claim 54 further including the step of creating a file of database records which includes all decryption keys corresponding to the encryption keys used to store images.

56. A method in accordance with claim 55 further including the step of creating another file of database records which includes all decryption keys corresponding only to the encryption keys used to store images which are to be treated as confidential material.

57. A system for controlling access to documents produced in litigation comprising at least two means each for storing both (i) images of documents, at least some of said images being in unredacted encrypted form, at least some of said images being in redacted unencrypted form, and at least some of said images being unredacted and unencrypted, and (ii) database records associated with said stored images, the record for each image containing multiple fields whose entries characterize the image; and at least two means connected respectively to said at least two storing means for selectively representing, for any unredacted encrypted image that is to be retrieved, the appropriate decryption key in a field of the record associated with such image, with one of said representing means representing fewer decryption keys than the other.

58. A system in accordance with claim 57 wherein each of said storing means stores, in a paired relationship, unredacted encrypted and redacted unencrypted forms of the same image.

59. A system in accordance with claim 57 wherein each of said storing means stores, in the database record associated with each stored image, data identifying whether the stored image is to be treated as confidential material.

60. A system in accordance with claim 59 wherein each of said storing means further stores, in the database record for any stored image which is to be treated as confidential material, data representative of the level of confidentiality.

61. A system in accordance with claim 59 wherein each of said storing means stores in encrypted form, using a confidentiality encryption key, each image which is to be treated as confidential material.

62. A system for controlling access to documents comprising at least two means each for storing both (i) images of documents, at least some, but not all, of said images being in unredacted encrypted form, and (ii) database records associated with said stored images, the record for each image containing multiple fields whose entries characterize the image; and at least two means connected respectively to said at least two storing means for selectively representing, for any unredacted encrypted image that is to be retrieved, the appropriate decryption key in a field of the record associated with such image, such image decryption key being represented in less than all of said representing means.

63. A system in accordance with claim 62 wherein each of said storing means stores, in a paired relationship, unredacted encrypted and redacted unencrypted forms of the same image.

64. A system in accordance with claim 62 wherein each of said storing means stores, in the database record associated with each stored image, data identifying whether the stored image is to be treated as confidential material.

65. A system in accordance with claim 64 wherein each of said storing means further stores, in the database record for any stored image which is to be treated as confidential material, data representative of the level of confidentiality.

66. A system in accordance with claim 64 wherein each of said storing means stores in encrypted form, using a confidentiality encryption key, each image which is to be treated as confidential material.

\* \* \* \* \*